US008402298B2

(12) United States Patent
Yabe

(10) Patent No.: US 8,402,298 B2
(45) Date of Patent: Mar. 19, 2013

(54) ARRAY-TYPE PROCESSOR HAVING DELAY ADJUSTING CIRCUIT FOR ADJUSTING A CLOCK CYCLE IN ACCORDANCE WITH A CRITICAL PATH DELAY OF THE DATA PATH

(75) Inventor: Yoshikazu Yabe, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1074 days.

(21) Appl. No.: 12/071,221

(22) Filed: Feb. 19, 2008

(65) Prior Publication Data

US 2008/0201526 A1 Aug. 21, 2008

(30) Foreign Application Priority Data

Feb. 20, 2007 (JP) ................................ 2007-039624

(51) Int. Cl.
*G06F 1/12* (2006.01)
*G06F 1/00* (2006.01)

(52) U.S. Cl. ........................................ 713/400; 713/500

(58) Field of Classification Search .................. 713/400, 713/500, 322, 401
See application file for complete search history.

(56) References Cited

U.S. PATENT DOCUMENTS 4,574,345 A * 3/1986 Konesky ........................ 713/600
5,598,408 A * 1/1997 Nickolls et al. ............... 370/351
5,682,491 A * 10/1997 Pechanek et al. ............. 712/209
5,742,180 A * 4/1998 DeHon et al. .................... 326/40
6,141,762 A * 10/2000 Nicol et al. ................... 713/300
6,738,891 B2 5/2004 Fujii et al.
7,003,055 B2 * 2/2006 Sexton et al. ................. 375/341
7,350,054 B2 3/2008 Furuta et al.
7,366,816 B2 * 4/2008 Rai ................................ 710/307
2001/0014922 A1 * 8/2001 Kuge ............................. 710/36
2001/0030903 A1 * 10/2001 Kuge et al. .................... 365/233
2002/0038418 A1 * 3/2002 Shimamura ................... 712/245
2004/0103264 A1 5/2004 Fujii et al.
2007/0096775 A1 * 5/2007 Elgebaly et al. .............. 327/105
2007/0241771 A1 * 10/2007 Schmit et al. .................. 326/38
2007/0266268 A1 * 11/2007 Abbo et al. .................... 713/322
2008/0025379 A1 * 1/2008 Hayem et al. ................. 375/216

FOREIGN PATENT DOCUMENTS

JP 64-007252 1/1989
JP 4-74207 (A) 3/1992
JP 2000-181566 (A) 6/2000
JP 2003-76668 (A) 3/2003
JP 2004-133781 4/2004
JP 3674515 5/2005

* cited by examiner

*Primary Examiner* — Thomas Lee
*Assistant Examiner* — Phil Nguyen
(74) *Attorney, Agent, or Firm* — Foley & Lardner LLP

(57) ABSTRACT

Disclosed is an array-type processor including a data path unit in which a plurality of processor elements are arranged in an array; a state-transition management unit that stores information for controlling changeover of data paths; and a delay adjusting circuit that adjusts delay of the input clock signal based upon information output from the state-transition management unit, and provides the delay-adjusted clock signal to the data path unit. The delay adjusting circuit has a delay control information memory and a programmable delay. The delay control information memory stores a plurality of items of delay control information, delay control information is read out using a configuration number supplied from the state-transition management unit as an address, and the delay control information is applied to the programmable array. The programmable delay delays the input clock signal by a delay time specified by the delay control information and provides the delayed clock signal to the data path unit.

4 Claims, 14 Drawing Sheets

10; DATA PATH UNIT
PE
PE
PE
PE
PE
PE
PE
PE
PE
11; PROCESSOR ELEMENT
12
STATE-TRANSITION MANAGEMENT UNIT
19; STATE NUMBER
18; LCLK
13; DELAY ADJUSTING CIRCUIT
14
DELAY CONTROL INFORMATION MEMORY
15
PROGRAMMABLE DELAY
17; DELAY CONTROL INFORMATION
16; GCLK

REFERENCE CLOCK
LCLK
STATE NUMBER
CONFIGURATION INFORMATION / DELAY CONTROL INFORMATION
DATA PATH
MEMORY / FF
T1
T2
T3
T4
T5
C1
C2
C3
C4
d1
d2
d3
d4

12
STATE-TRANSITION MANAGEMENT UNIT
121
STATE MANAGEMENT INFORMATION MEMORY
10; DATA PATH UNIT
PE
11; PROCESSOR ELEMENT
19; STATE NUMBER
18; LCLK
14
DELAY CONTROL INFORMATION MEMORY
15
PROGRAMMABLE DELAY
17
13; DELAY ADJUSTING CIRCUIT
16; GCLK
21; CLOCK CHANGEOVER SIGNAL
20; WRITE CONTROL SIGNAL

10; DATA PATH UNIT
PE
23
EXTERNAL CIRCUIT
12
STATE-TRANSITION MANAGEMENT UNIT
19; STATE NUMBER
18; LCLK
13; DELAY ADJUSTING CIRCUIT
11; PROCESSOR ELEMENT
14
DELAY CONTROL INFORMATION MEMORY
15
PROGRAMMABLE DELAY
17
16; GCLK
22; DATA INPUT/OUTPUT CONTROL SIGNAL

REFERENCE CLOCK
LCLK
STATE NUMBER
CONFIGURATION INFORMATION / DELAY CONTROL INFORMATION
DATA PATH
MEMORY / FF
DATA INPUT / OUTPUT CONTROL SIGNAL
EXTERNAL CIRCUIT
T1
T2
T3
T4
T5
C1
C2
C3
C4
d1
d2
d3
d4

GCLK
CLOCK SELECTING SIGNAL
LCLK
STATE NUMBER
CONFIGURATION INFORMATION / DELAY CONTROL INFORMATION
DATA PATH
MEMORY / FF
T1
T2
T3
T4
T5
C1
C2
C3
C4
d1
d2
d3
d4

101
STATE-TRANSITION MANAGEMENT UNIT
EVENT
EXTERNAL EVENT PATH
104; EVENT NOTIFICATION PATH
103; OPERATION CONTROL PATH
DATA OUTPUT
106; PROGRAMMABLE SWITCH ELEMENT
105; PROCESSOR ELEMENT
102; DATA PATH UNIT
DATA INPUT

210: STATE NUMBER
209: CONFIGURATION INFORMATION
CONFIGURATION INFORMATION MEMORY
201
211: INSTRUCTION CODE
202: FUNCTION UNIT
RFU1
204
RFU2
205
MUX1
206
MUX2
207
ALU
208
WIRING CONNECTION CIRCUIT
203
TO UPPER PE
TO LEFT PE
TO LOWER PE
TO RIGHT PE

ARRAY-TYPE PROCESSOR HAVING DELAY ADJUSTING CIRCUIT FOR ADJUSTING A CLOCK CYCLE IN ACCORDANCE WITH A CRITICAL PATH DELAY OF THE DATA PATH

REFERENCE TO RELATED APPLICATION

The present application is claiming the priority of the earlier Japanese patent application No. 2007-039624 filed on Feb. 20, 2007, the entire disclosure thereof being incorporated herein by reference thereto.

FIELD OF THE INVENTION

This invention relates to a processor that is capable of executing desired processing by being programmed. More particularly, the invention relates to an array-type processor in which processor elements are arranged in the form of an array.

BACKGROUND OF THE INVENTION

A variety of microprocessors are known to be programmable devices. In such a microprocessor, instructions stored in memory are read out successively and executed sequentially. The microprocessor implements a series of processes of interest by combining and executing, in accordance with the order in which the instructions are processed, individual instructions each of which specifies very simple processing.

This microprocessor is such that since the number of instructions that can be executed simultaneously by a single processor is several at most, the degree to which processing capability can be improved is limited. More specifically, if the same processing is applied to a large quantity of data, it is necessary to repeat sequential processing for one item of data at a time. This means that processing capability cannot be improved.

On the other hand, in a case where the data processing to be executed is limited to a single data process, if a logic circuit is formed by hardware so as to execute the single data process, it will not be necessary to read instructions out of memory in order and sequentially execute processing in order. Although this will make it possible to execute complex data processing at high speed, naturally only a single data process can be executed.

In other words, with a data processing system in which application programs are switched among freely, various types of data processing can be executed but it is difficult to execute data processing at high speed because it is necessary to execute processing sequentially.

With a logic circuit comprising hardware, on the other hand, it is possible to execute data processing at high speed but only a single data process can be executed because the application program cannot be modified.

In an effort to eliminate these tradeoffs, array-type processors have been proposed as data processing devices in which the configuration of the hardware changes in conformity with the software (see Patent Documents 1 to 3).

An array-type processor described in Patent Document 1 is a small-size, high-capability array type processor provided independently with a data path unit, which operates primarily as an operating unit, comprising an array of processor elements electrically connected by programmable switches, and a state-transition management unit, which exercises control, configured to facilitate implementation of state transition means, these sections being implemented by configurations customized to the purpose of processing.

FIG. 10 illustrates the configuration of an array-type processor disclosed in FIG. 1 of Patent Document 1. As shown in FIG. 10, the array-type processor includes a data path unit 102 and a state-transition management unit (or simply a state management unit) 101 for controlling the data path unit 102. The data path unit 102 includes a plurality of processor elements (PE) 105 disposed in a two-dimensional array.

The array-type processor described in Patent Documents 1 and 2 manages the "state" of operation of the processor by, e.g. a number (state number). On the assumption that management of processor operation will transition from a certain operating state to another operating state, a state number that has been stored in a state management information memory 121 of the state-transition management unit is read out and the processor performs an operation corresponding to the state number read out. It should be noted that the term "state" refers to the state of a processor element 105 or programmable switch element 106.

This state number is associated with the address of an instruction code memory that stores an instruction code and the address of a connection-configuration information memory that specifies the mutual connection configuration between programmable switch elements 106 (there are cases where these two addresses are simply referred to as "instruction code addresses"), these being output from the state-transition management unit 101. The operation of the processor elements 105 and the relationship of the connections of the programmable switch elements 106 are decided by an instruction code address applied to the data path unit 102 through an operation control path 103. Specifically, each processor element 105 performs an operation in accordance with the instruction code address supplied thereto. Further, each programmable switch element 106 makes an electrical connection between the interior and exterior of the data path unit 102. The state number will be described below directly in the form of an instruction code address.

The state-transition management unit 101 has a state-transition table memory (not shown). The state number of a subsequent cycle is stored in the state-transition table memory. State numbers are read out successively in accordance with the present internal state of the state-transition management unit 101 or the condition of an event signal from the outside. Since the state signal is in the form of an instruction code address, the state signal that has been read out is input to the data path unit 102 through the operation control path 103.

FIG. 11 illustrates a typical example of the configuration of the processor element 105. The processor element includes configuration information memory 201, a function unit 202 and a wiring connection circuit 203. Although the wiring connection circuit 203, which serves as a switch element, and the configuration information memory 201 are placed in the processor element 105, these may be placed outside the processor element.

The configuration information memory 201 is a memory that stores a plurality of items of configuration information. The configuration information is read out using a state number 210 from the data path unit 102 of FIG. 10 as an address. Similarly, an instruction code is read out of an instruction code memory (not shown) in the data path unit, and a decoded instruction code 115 is applied to a processor element 11.

Configuration information 209 is a signal that sets the connection relationship between the function unit 202 and the wiring connection circuit 203, namely the internal configuration of the processor elements. This information is supplied from the configuration information memory 201 to the function unit 202 and wiring connection circuit 203.

The function unit 202 has one or more functions such as those of an arithmetic unit, memory and register, etc., and the wiring connection circuit 203 has a function for changing over the connection of the function unit in each processor element and the connections between processor elements.

Further, by way of example, the function unit 202 is constituted by two register file units (RFU1, RFU2), two multiplexers (MUX1, MUX2) and an arithmetic and logic unit (ALU).

In each processor element, configuration information corresponding to a state number is read out of the configuration information memory 201, and the function of the function unit 202 and connections of the wiring connection circuit 203 are decided.

Since the data path constructed by the entire array is thus decided by the configuration information, data paths equivalent to the number of items of configuration information that can be stored in the configuration information memory 201 can be constructed.

Since the configuration information 209 is read out by the state number 210, the configuration of the data path can be modified by controlling the state number. This constructing of a connection relationship in accordance with configuration information in the configuration information memory pointed to by the state number is referred to as "mapping".

After mapping is carried out, the data path unit executes processing in conformity with instruction code 211 from the instruction code memory.

Mapping is performed utilizing all operation resources and wiring resources of the data path unit 102. Naturally, divided processes cannot be executed by the data path unit 102 simultaneously, but the state-transition management unit 101 changes over mapping of the data path cycle by cycle and executes the divided processes one after another.

In other words, the processor of the above-described type causes state numbers to make a transition and sequentially processes instructions corresponding to the state numbers by circuit configurations corresponding to the state numbers, thereby executing the application.

When an application program to be processed is compiled in the array-type processor of the above described related art, the application program is analyzed and is converted to the form of a state transition of a processor element or switch element. Upon executing the application program, into what circuit configuration (connection information of the data path unit) the processor element or switch element is to be placed and what instruction is to be executed at the time of this state are converted to a state number, configuration information of the circuit and instruction code, and transition information indicating the course of this state transition is constructed. Before the application program is executed, the state number and transition information are stored in the state-transition management unit and the configuration information of the circuit and instruction code are stored in the data path unit. The transition information is stored in the transition table.

The operation of an example of the related art will be described with reference to a detailed arrangement.

As execution of an application program, the array-type processor disclosed in Patent Documents 1 and 2 uses a sequencer (not shown) to output state numbers 210 from a state-transition table memory (not shown) of the state-transition management unit 101 to the processor elements 105 (and switch elements 106) of the data path unit 102 successively through the operation control path 103. Here the switch element 106 is incorporated in the processor element 105 as a wiring connection circuit 203. Upon receiving a state number 210, the processor outputs the configuration information specified by the state number 210 to the function unit 202 and wiring connection circuit 203.

Further, the state number 210 is sent to an instruction code memory (not shown), an instruction code is read out from the address of the instruction code memory that corresponds to the state number 210 and a decoded instruction code 211 is sent to the processor element 105. The instruction code 211 is sent to the ALU 208 and registers RFU1 (204) and RFU2 (205) within the processor element 105.

Thus, the configuration information is stored in the configuration information memory 201 in advance.

In the function unit 202, the configuration information thus sent is input to the multiplexers MUX1 and MUX2 as input selection signals, thereby constructing this partial circuit configuration.

Similarly, in accordance with configuration information read out from the configuration information memory 201, the wiring connection circuit 203 constructs a circuit configuration between the RFU1, RFU2, MUX1, MUX2 and wiring connection circuits of the processor elements above, below and to the left and right of its own processor element and performs a data transfer between the wiring connection circuits of the processor elements in accordance with the circuit configuration constructed.

By thus constructing the circuit, a write address and a read address, for example, are input to the RFU1, RFU2 from the instruction code 211 obtained by decoding the instruction code that has been read out of the instruction code memory or from another processor element through the wiring connection circuit 203.

In accordance with this input selection signal, MUX1, MUX2 select either an input from the register file unit (RFU1, RFU2) or an input from the wiring connection circuit 203 and output this signal as data to the ALU 208.

The instruction code 211 along with the circuit architecture based upon the configuration information are sent to the ALU 208. The ALU 208 subjects the data, which has been input in accordance with the constructed circuit, to processing that conforms to the instruction code and outputs the result to the wiring connection circuit 203. The wiring connection circuit 203 delivers this to the processor element of the succeeding stage that operates in a similar manner.

This series of operations is repeatedly executed by the application program in accordance with the state transition of the array-type processor. It should be noted that the state transition of the array-type processor is performed in sync with a clock.

FIGS. 12 and 13 illustrate an example of the data-path configuration (example of mapping) of a data path unit using this processor element.

Here processor elements (PE) are arranged in the form of a 4×4 two-dimensional array. In FIGS. 12 and 13, for the sake of convenience, RFU1, RFU2 and ALU in FIG. 11 are indicated by R1, R2 and A, respectively. Further, in order to distinguish among the processor elements within the array, numbers PE(i,j) are assigned to each of the processor elements, as illustrated.

FIG. 12 (configuration example 1) illustrates an example of a case where a path on which a plurality of ALUs exist is constructed between registers, which are sequential circuits. FIG. 13 (configuration example 2) illustrates an example of a case where, conversely, a path not having even a single ALU is constructed between registers. In other words, FIG. 12 (configuration example 1) is an example of a case where critical path delay is large, whereas FIG. 13 (configuration example 2) is an example of a case where critical path delay is small.

If we let 1T (a unit of delay) represent the data transfer delay between processor elements and the delay of the ALU, then the critical path of configuration example 1 in FIG. 12 will be the path from PE (0,0) to PE (3,3), and the delay time will be 6T (the three delays of the ALUs and the three data transfer delays between processor elements).

Further, in the configuration example 2 of FIG. 13, there are three paths, namely paths from PE (0,0) to PE (0,1), from PE (0,1) to PE (0,2) and from PE (0,2) to PE (0,3). However, the total delay time is 1T and the critical path delay also is 1T.

With the array-type processor of the related art described in Patent Documents 1 and 2, the transition of the state of the data path unit at the time of actual operation is decided by the compilation result of the application program. In other words, what the transition of the change in the circuit configuration will be is decided.

With such an array-type processor of the related art, arrangements having significantly different critical path delays (6T and 1T) are switched between every clock cycle of the array-type processor, as in configuration examples 1 and 2, and this switching takes place frequently.

With such an array-type processor of the related art, maximum operating frequency is decided by the maximum value of the critical path delays of the entire configuration. In this case, ⅙T is the maximum operating frequency.

FIG. 14 is a timing chart useful in describing the problems of the related art shown in FIG. 10. It should be noted that FIG. 14 has been created by the present patent applicants in order to describe the problems of the related art; it is not cited in Patent Document 1.

In FIG. 14, T1, T2, T3, T4 and T5 represent the rise timings of a clock, and C1, C2, C3 and C4 represent the intervals between these timings.

The shaded portions of the data path indicate that the state of the data path has not been determined, and d1, d2, d3 and d4 indicate critical path delays. Among these, d4 is the largest delay. Cycle time must be equal to or greater than d4.

The critical path delay d3 of the T3 cycle is small in comparison with d4, and processing is not executed during the time that corresponds to the difference between these. This time is wasted time if processing efficiency is considered.

With the related art described above with reference to FIGS. 10 to 13, it is possible to switch among a plurality of data paths based upon configuration information. However, in a case where the critical path delay of every data path is different, it is necessary to make operating frequency conform to the maximum delay; operation at high speed in excess of this value of frequency is not possible.

In particular, if the variation in critical path delay is large, an arrangement having a small critical path will not execute any processing for a large part of cycle time.

If delay time is divided equally when processing is divided into data paths (when the above-described compiling is performed), the problem is solved. In actuality, however, such allocation is technically difficult at present.

When an application is compiled and processing is divided into data paths, processing efficiency can be raised by adjusting cycle time in conformity with critical path delay rather than equalizing critical path delays. In general, however, processors that execute processing in parallel operate on the assumption of cycle time of a fixed time interval. Although the processors execute processing in sync in a case where the processors communicate, they operate independently at other times.

In general, therefore, it is difficult to adjust the cycle time of parallel processing processors and to improve operation efficiency.

The arrangement of Patent Document 3 is an example of related art under specific conditions. This arrangement is characterized in that in data transfer between processor elements, cycle time is adjusted in accordance with this data transfer time. Patent Document 3 is a technique regarding data transfer and does not give a detailed description regarding the configuration of a processor array. In addition, for the reasons set forth above, with the related art it is difficult to implement adjustment of cycle time that takes the operation time of processor elements into account. Furthermore, in Patent Document 3, it is necessary to operate processors using the double edges of a clock. Further, in generation of the clock, it is necessary to use a clock whose half period is operation time (ALU delay time). The problem is that a clock having a high speed in comparison with cycle time is required.

[Patent Document 1] Japanese Patent No. 3674515

[Patent Document 2] Japanese Patent Kokai Publication No. JP-P2004-133781A

[Patent Document 3] Japanese Patent Kokai Publication No. JP-A-64-7252

SUMMARY OF THE DISCLOSURE

As mentioned above, in the array-type processor of the related art, it is difficult to adjust the cycle time of parallel processing processors and to improve operation efficiency in accordance with the critical path of every clock cycle. Further, in a processor of the kind described in Patent Documents 1 and 2 in which a plurality of processor elements (PEs) arranged in an array and switch elements for changing over the connection relationships between processor elements by hardware are provided in the same semiconductor element, the connection between processor elements is changed over by switch elements in accordance with an executed application program, and the circuit structure is changed dynamically by changing the connection relationships or number of arithmetic and logic units (ALUs) provided in paths (data paths) between sequential circuits (flip-flops, latches and memories, etc.) possessed by the array-type processor, it is difficult to equalize critical path delays and improve processing when an application is compiled and processing is divided into data paths.

According to the present invention, there is provided an array-type processor in which the configuration of a data path is allowed to be changed over in association with a clock cycle, comprising a circuit unit that adjusts a delay of a clock signal supplied thereto, length of the clock cycle being adjustably changed in accordance with the data path configured.

More specifically, an array-type processor according to the present invention comprises: a data path unit in which a plurality of processor elements are arranged in an array; a state-transition management unit storing information for controlling changeover of data paths; and a delay adjusting circuit that adjusts a delay of an input clock signal based upon information output from the state-transition management unit, and provides the delay-adjusted clock signal to the data path unit; wherein length of a clock cycle is adjustably changed in accordance with the data path configured.

In the present invention, the delay adjusting circuit includes: a delay control information memory and a programmable delay; wherein the delay control information memory stores a plurality of items of delay control information, delay control information is read out using a state number from the state-transition management unit as an address, and the delay control information is applied to the programmable array; and the programmable delay delays the input clock signal by a delay specified by the delay control information and provides the delayed clock signal to the data path unit.

In the present invention, each processor element includes: a configuration information memory for holding a plurality of items of configuration information, the configuration information being read out using a state signal, which is supplied from the state-transition management unit, as an address; a function unit including at least one function from among the function of an ALU, the function of a memory and the function of a register; and a wiring connection circuit for changing over the form of connection in the function unit in the processor element and the form of connection with other processor elements; wherein the function unit and wiring connection circuit have their form of connection and operation decided by configuration information from the configuration information memory.

In the present invention, the delay adjusting circuit receives a clock changeover signal for controlling changeover of an output from the programmable delay between an output at the time of program operation and an output at the time of data processing; wherein a write control signal that includes data prevailing at the time of program operation is received by delay adjusting circuit; at the time of program operation on the basis of the clock changeover signal, the programmable delay is adjusted and data transfer is performed synchronously between an output source of the write control signal and a write destination of the data of the write control signal among the delay control information memory of the delay adjusting circuit, a state control information memory of the state-transition management unit and a configuration information memory within the processor element; and at the time of data processing on the basis of the clock changeover signal, a clock signal obtained by delaying the input clock signal by the programmable delay in accordance with the delay control information is output.

In the present invention, the delay control information memory of the delay adjusting circuit is provided with data input/output control information in addition to the delay control information, the input/output control information is output as a data input/output control signal in accordance with the state number, and the data input/output control signal is supplied to an external circuit that performs a data transfer with the data path unit; and the external control circuit controls data input/output by observing the data input/output control signal; delay of the clock signal being adjusted by the programmable delay in such a manner that synchronization between the data path unit and external circuit is achieved at the time of data transfer with the external circuit.

In the present invention, the delay adjusting circuit includes a clock selecting circuit that receives the input clock signal and the clock signal output from the programmable delay, selects one of received signals based upon the value of an entered clock selection signal and supplies the selected signal to the programmable delay.

The meritorious effects of the present invention are summarized as follows.

In accordance with the present invention, cycle time of each configuration can be adjusted to a predetermined programmed value by the provision of a delay adjusting circuit. In accordance with the present invention, if preceding or succeeding cycle time can be shortened, then cycle time of a configuration having a large critical path delay can be elongated correspondingly, maximum operating frequency can be raised and processing efficiency can be improved.

Other features and advantages of the present invention will be apparent from the following description taken in conjunction with the accompanying drawings, in which like reference characters designate the same or similar parts throughout the figures thereof.

PREFERRED MODES OF THE INVENTION

Examples of the present invention will be described in detail with reference to the accompanying drawings.

First Example

Figure 1:
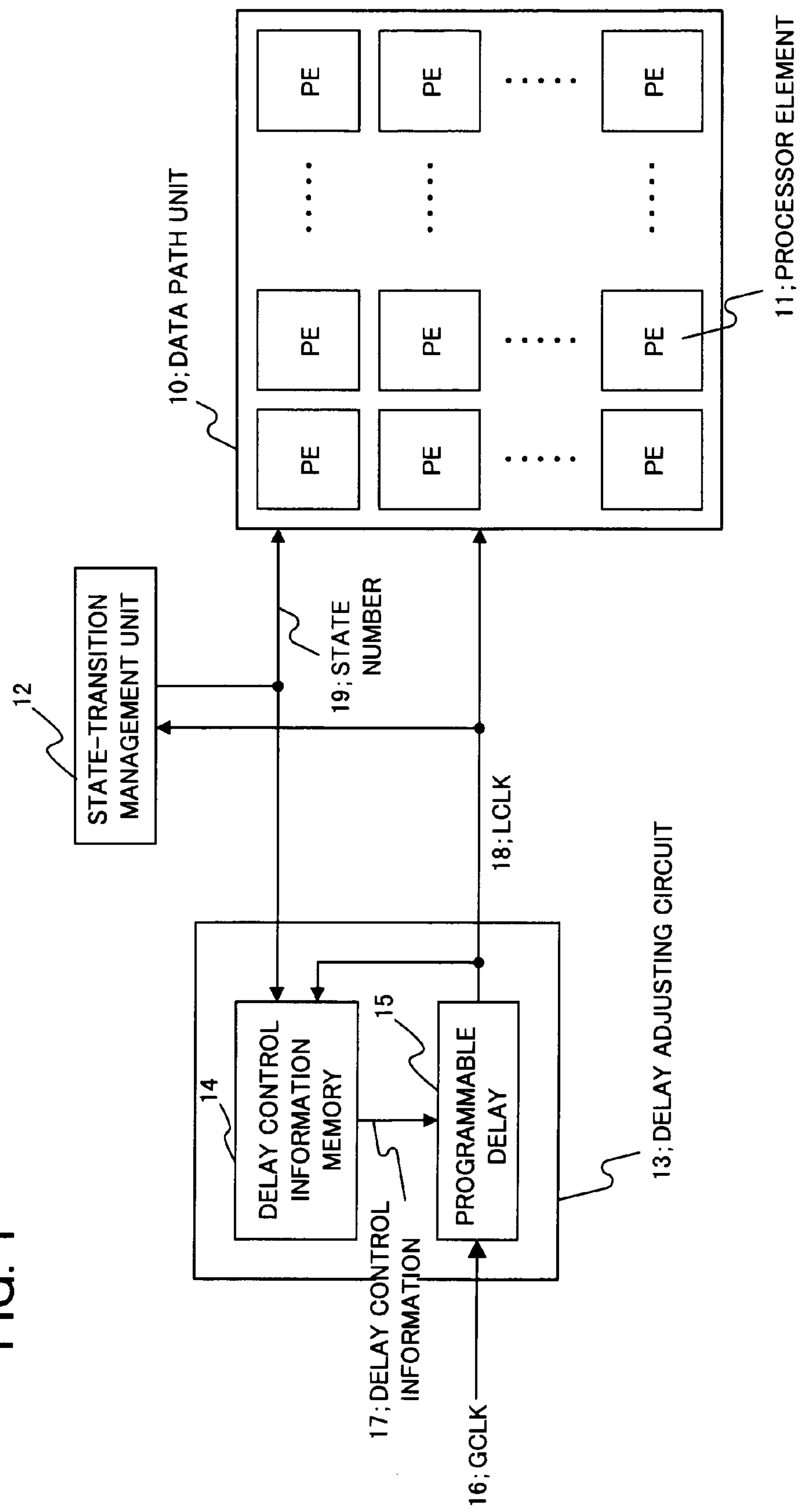
FIG. 1 is a diagram illustrating the arrangement of a first example of the present invention.
Figure 2:
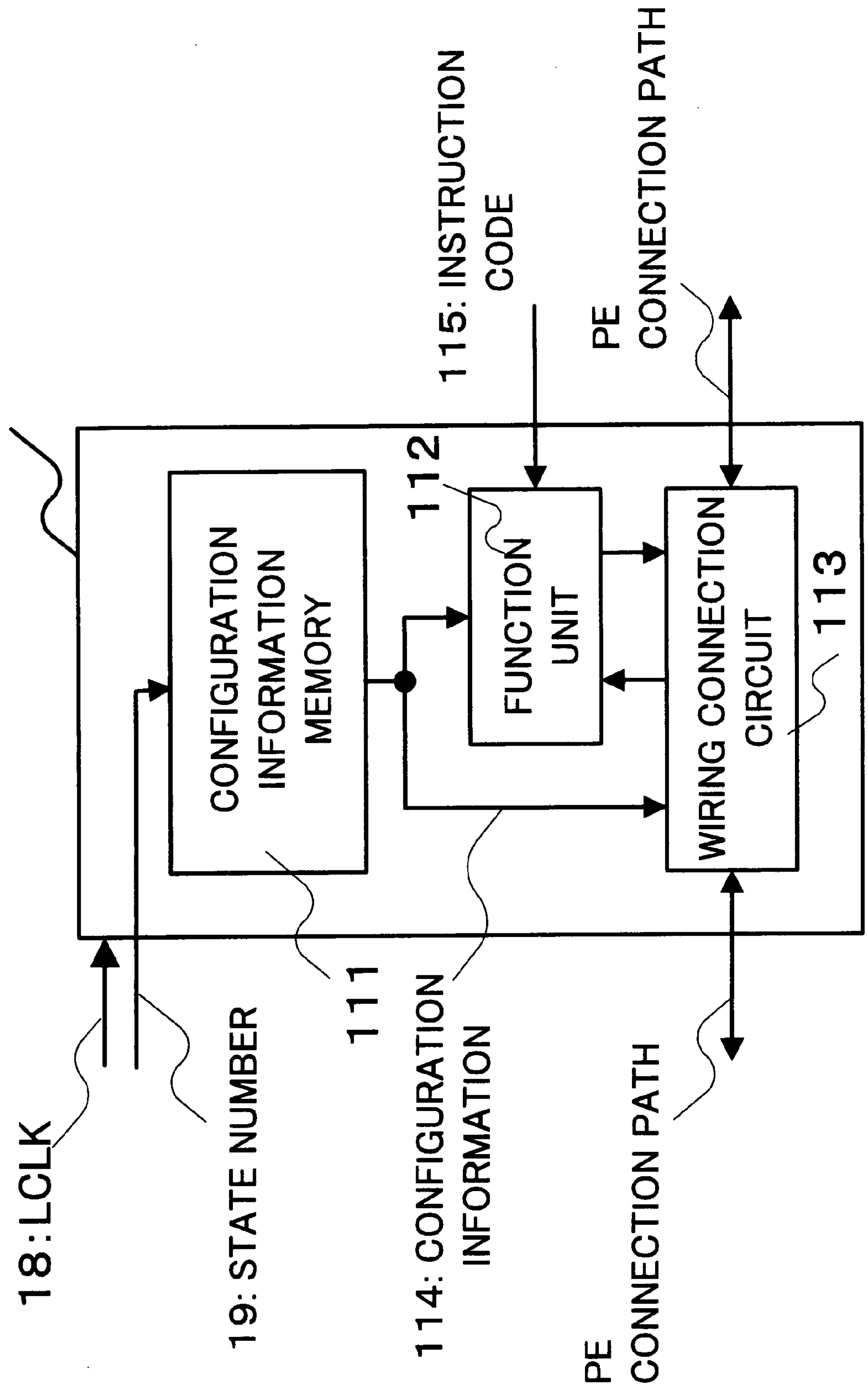
FIG. 2 is a diagram illustrating the configuration of a processor element according to an example of the present invention.

A first example of the present invention will now be described. FIG. 1 is a diagram illustrating the configuration of an array-type processor according to the first example of the present invention, and FIG. 2 is a diagram illustrating the configuration of a processor element (PE) in FIG. 1. The present invention will be described with reference to FIGS. 1 and 2.

Figure 10:
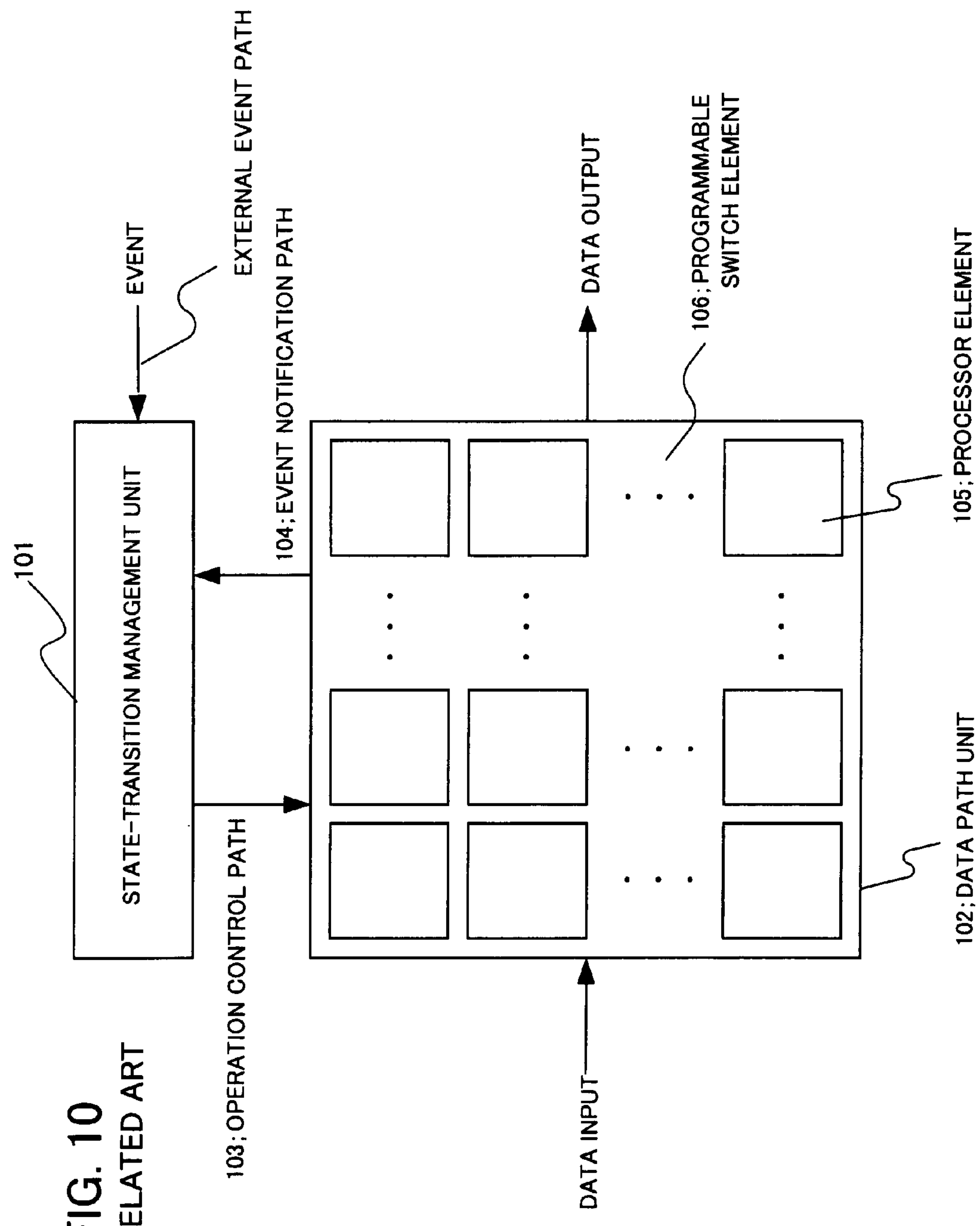
FIG. 10 is a diagram illustrating an arrangement according to the related art.
Figure 11:
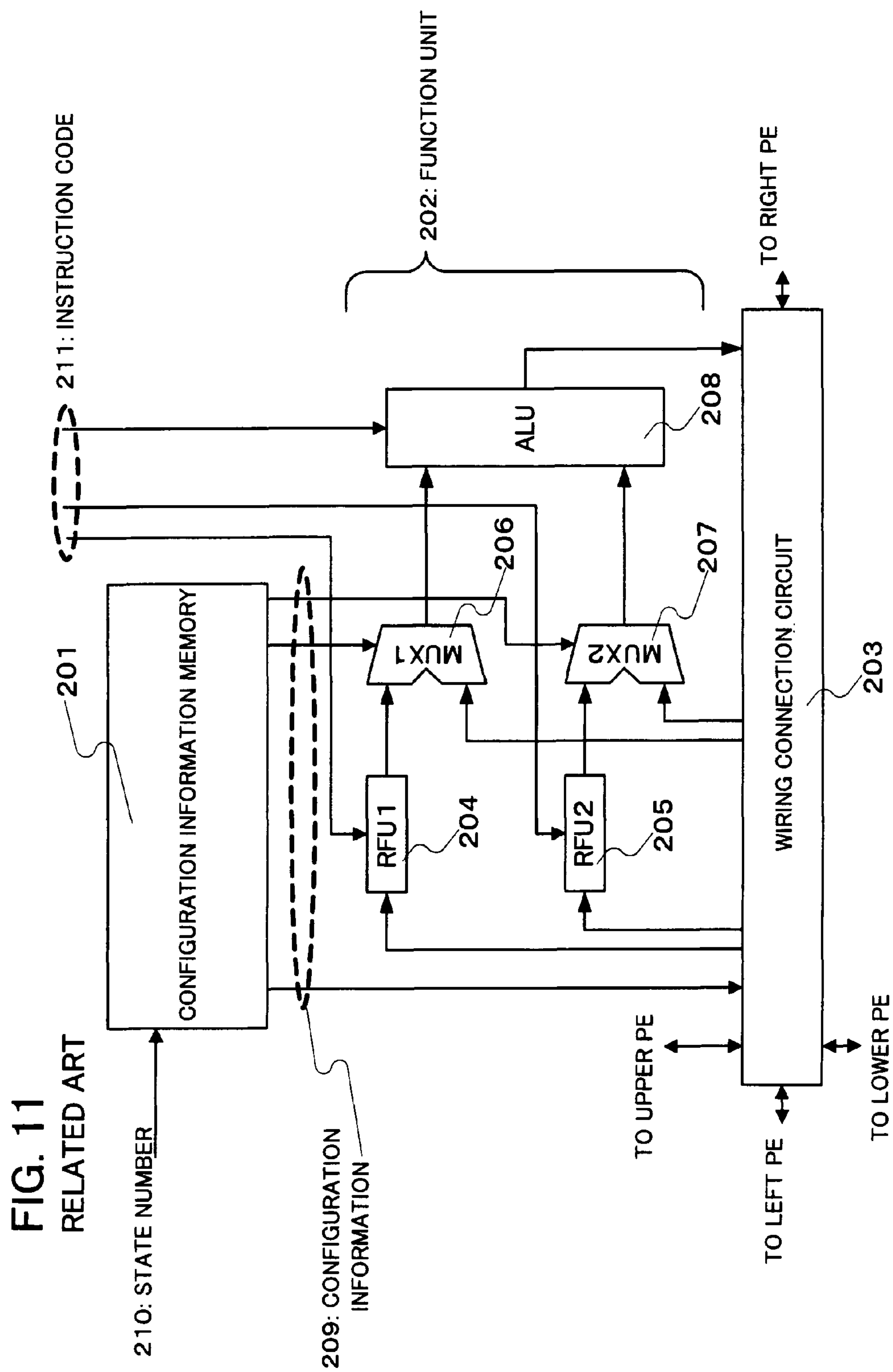
FIG. 11 is a diagram illustrating a typical example of the configuration of a processor element.
Figure 12:
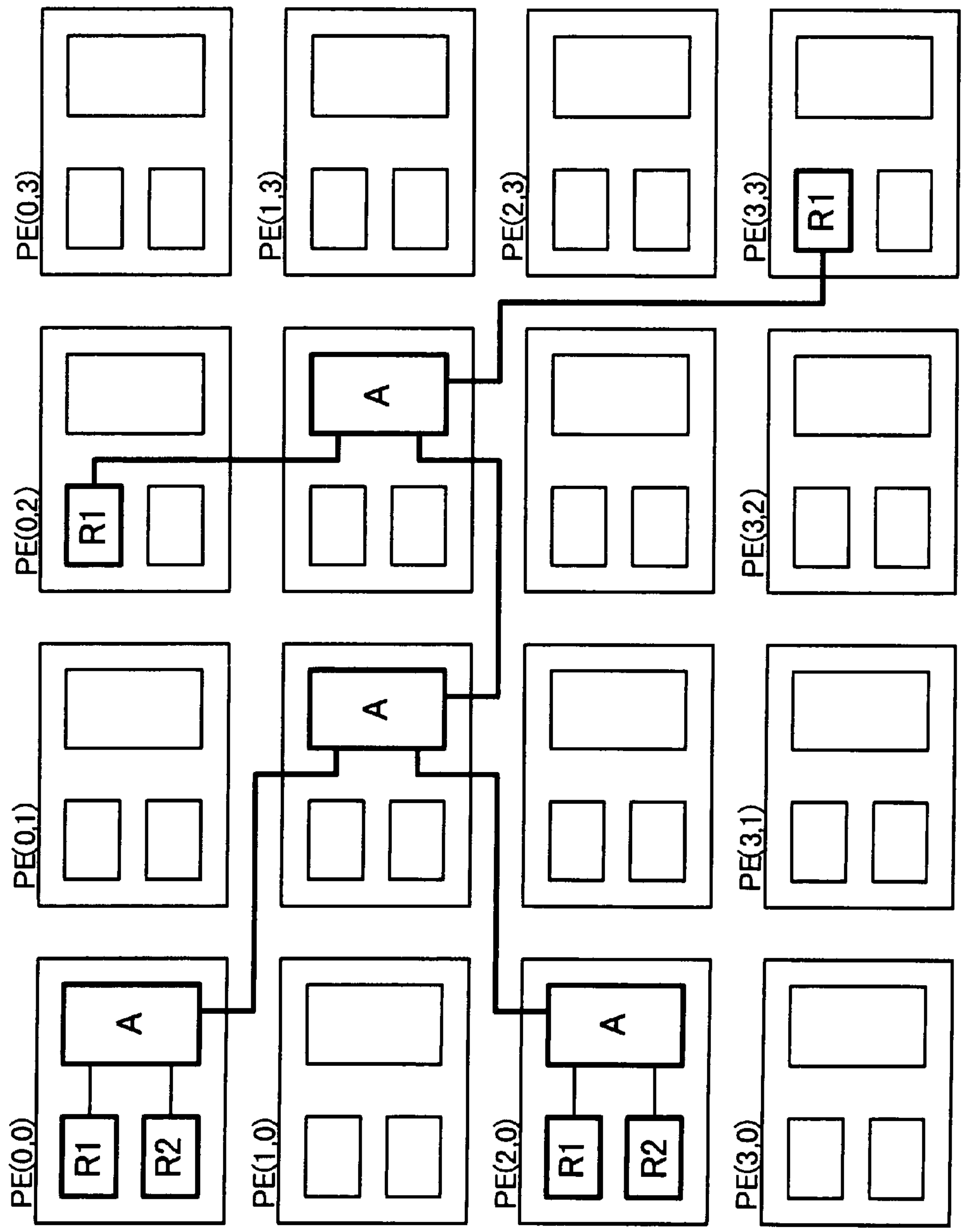
FIG. 12 is a diagram for describing an overview of operation of a data path unit.
Figure 13:
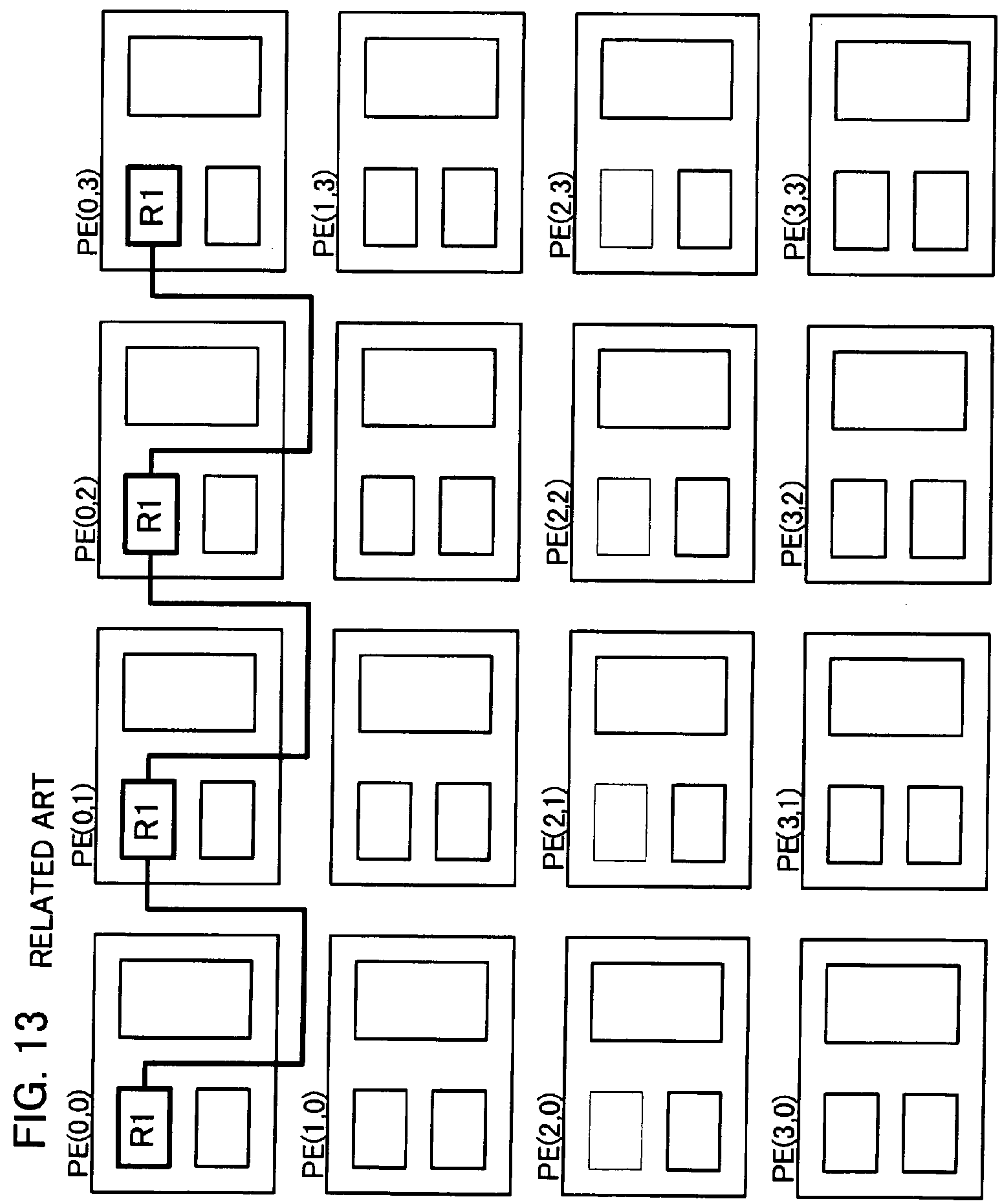
FIG. 13 is a diagram for describing an overview of operation of a data path unit.
Figure 14:
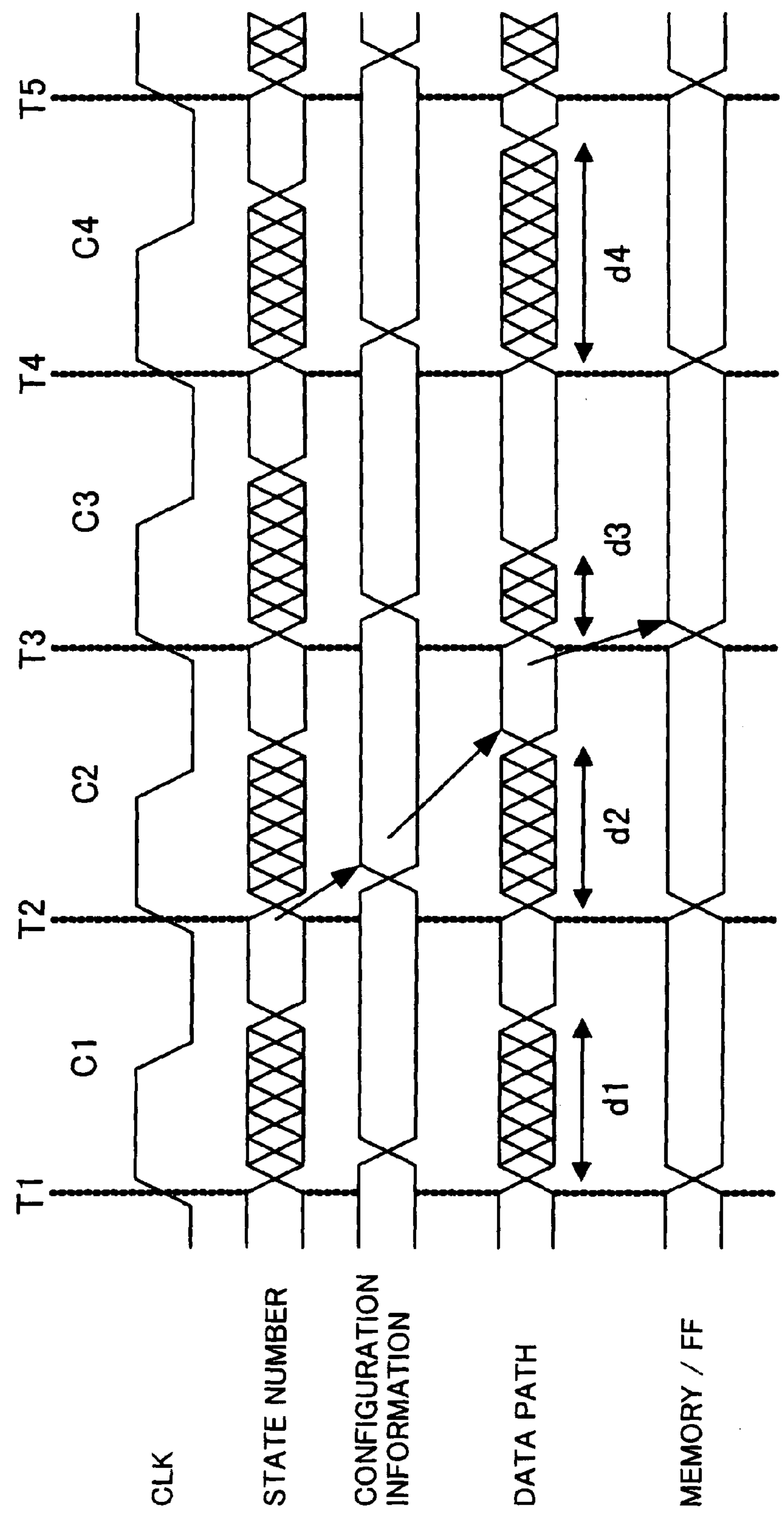
FIG. 14 is a timing chart for describing the operation of FIG. 10.

As shown in FIG. 1, the array-type processor includes a data path unit 10, a state-transition management unit 12 and a delay adjusting circuit 13. The structures of the data path unit 10 and state-transition management unit 12 are similar to those shown in FIGS. 10 and 11 illustrating the array-type processor of the related art.

The state-transition management unit 12 includes a sequential unit and a state-transition table memory (neither of which are shown). The sequential unit of the state-transition management unit 12 reads a state number 19 out of the state-transition table memory and outputs the state number 19 to cause a transition in the state of the array-type processor.

The data path unit 10 has a plurality of processor elements (PE) 11 arranged in a two-dimensional array and includes an instruction code memory, not shown.

As shown in FIG. 2, each processor element 11 includes a configuration information memory 111, a function unit 112 and a wiring connection circuit 113. The wiring connection circuit 113, which is a switch element, is provided internally.

The function unit 112 and wiring connection circuit 113 correspond to the function unit 202 and wiring connection circuit 203, in FIG. 11, respectively. The connection relationship of the circuit, and hence the circuit configuration, is decided in accordance with configuration information from the configuration information memory 111.

The function unit 112 has one or more functions such as those of an ALU, memory and register (ALU and sequential circuit), which are not shown, and has a multiplexer, etc., capable of changing the circuit configurations.

The wiring connection circuit 113 has a function for changing over the connection of the function unit 112 in each processor element 11 and the connections between processor elements 11.

The configuration information memory 111 is a memory for storing a plurality of items of configuration information. Configuration information 114 is read from an address of the configuration information memory 111 pointed to by the state number 19 from the state-transition management unit 12 of FIG. 1.

Further, an instruction code that has been read out of an instruction code memory in the data path unit using the state number 19 as an address is decoded. As a result, a decoded instruction code 115 is applied to the arithmetic unit and sequential circuit (not shown) in the function unit 112.

The delay adjusting circuit 13 has a delay control information memory 14 and a programmable delay 15.

The delay control information memory 14 stores the plurality of items of delay control information described above. Delay control information 17 is read out using the state number 19 from the state-transition management unit 12 as an address. The delay control information 17 is output to the programmable delay 15, thereby controlling the delay of the programmable delay 15.

The programmable delay 15 delays an entered global clock (GCLK) 16 by a delay specified by the delay control information 17 and outputs the clock as a local clock (LCLK) 18. It should be noted that the clock GCLK is supplied from outside the array-type processor or from an internal clock generator.

It should be noted that the state number 19 distributed from the state-transition management unit 12 to the data path unit 10 and delay adjusting circuit 13 is constituted as an operation control path, by way of example. Further, the signal from the data path unit 10 (e.g., the event notification path of the related art example) is deleted.

In the array-type processor of the present invention, the state number 19 that forms the basis of operation has been correlated as a reference number with a configuration information and instruction code stored in the processor element 11 and instruction code memory (not shown), respectively. In addition, the state number 19 has been correlated with delay control information stored in the delay control information memory 14.

More specifically, it will suffice if the state number is handled as the addresses of the configuration information memory 111, instruction code memory and delay control information memory 14.

These items of information are created when an application is compiled and they are stored in the corresponding memories before the application is executed.

The operation of the array-type processor according to the present invention thus constructed will now be described.

First, the state-transition management unit 12 outputs the state number 19. In other words, the sequencer in the state-transition management unit 12 reads the state signal out of the state-transition table memory and outputs the state signal.

Each processor element 11 within the data path unit 10 accepts the state number 19 from the state-transition management unit 12. The state number 19 enters the configuration information memory 111 (see FIG. 2) in each processor element 11, and configuration information is read out of the memory using the state number 19 as an address.

The configuration information is input to the function unit 112 and wiring connection circuit 113 in the processor element 11.

In accordance with the configuration information, the wiring connection circuit 113 makes connections within the processor element 11 and makes connections between processor elements 11.

On the other hand, the state number 19 is sent to the instruction code memory within the data path unit 10, in response to which an instruction code corresponding to this state number is read out of the memory. Here also the state number 19 has been associated with the address of the instruction memory. The instruction code read out is decoded, and the decoded instruction code 115 is applied to the function unit 112 of the processor element 11.

In accordance with the configuration information thus input, the function unit 112 changes the circuit configuration and executes processing in accordance with the instruction code 115.

In the overall data path unit 10, therefore, a data path that operates in one cycle is constructed and processing is executed.

Further, the delay adjusting circuit 13 accepts the state number 19 from the state-transition management unit 12. The state number is input to the delay control information memory 14 in the delay adjusting circuit 13 and delay control information 17 is read out using this state number as an address.

The delay control information 17 read out is input to the programmable delay 15.

The programmable delay 15 delays the global clock (GCLK) 16 by the amount of delay decided by the delay control information 17 and outputs the local clock (LCLK) 18. In other words, the delay control information 17 is information for adjusting the timing of the clock of each processor element in accordance with the configuration of the data path unit and content of the instruction code that prevail in the array-type processor when the array-type processor is in the state indicated by the corresponding state number 19.

The result of the processing executed in this state is delivered in accordance with the configuration of the data path unit to other processor elements and to the processor element of this data path unit through the wiring connection circuit 113 and path within the processor element, a similar transition conforming to the next state number (state) that is output by the state-transition management unit 12 is performed and the succeeding processing is executed.

Figure 3:
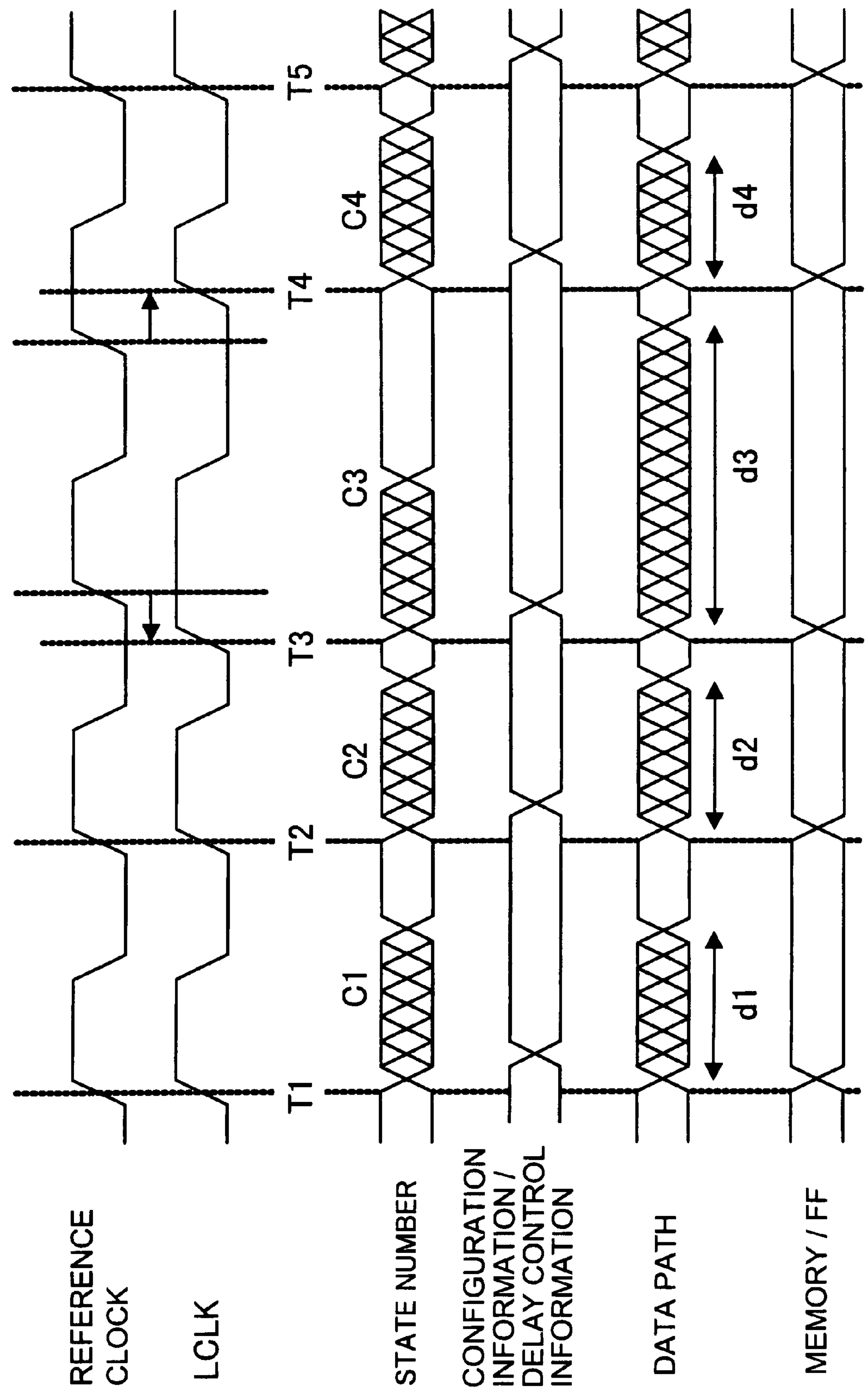
FIG. 3 is a timing chart useful in describing the operation of the first example of the present invention.

The operation for adjusting the timing of the clock in the first example of the present invention will be described with reference to FIG. 3. In FIG. 3, T1, T2, T3, T4 and T5 represent the rise timings of the local clock, and C1, C2, C3 and C4 represent the intervals between these timings. A reference clock shown in FIG. 3 is illustrated in order to facilitate understanding. In a case where the global clock (GCLK) 16 is delayed by a fixed delay and the cycle time is not changed by delay control, the reference clock is output as the local clock (LCLK) 18.

Further, d1, d2, d3 and d4 are delay values of critical (maximum delay) paths of data paths formed in each cycle.

The delay value differs depending upon the data path formed. Here d3 is the largest and is greater than the cycle time of the global clock.

The basic operation of the processor element 11 will be described taking one cycle of operation as an example.

At the rise time T1 of the local clock (LCLK), the state number 19 prevailing at this time is held in the configuration information memory 111 and delay control information memory 14, and the items of configuration information 114 and delay control information 17 are read out using the state number 19 as an address.

In a case where data memories and flip-flops are provided in the processor element 11 and a read-out operation has been designated by the configuration information, this data is read out.

A function conforming to the configuration information is formed within each processor element 11, and a data path is formed as the overall data path unit 10.

An operation is performed in the formed data path, and the operation ends after the delay d1.

At time T2, the result of the operation on the data path is written to those data memories and flip-flops in the processor element for which a write operation has been designated by the configuration information.

Further, the programmable delay 15 delays the global clock (GCLK) 16 in accordance with the delay control information 17 and decides the rise timing of the local clock (LCLK) of the next cycle.

The rising edge of the local clock (LCLK) is made earlier than that of the reference clock at time T3 and is made later at time T4. As a result, the cycle time of the interval C3 is longer than the cycle time of the reference clock.

The cycle time is fixed in the related art. Further, the data paths formed have respective critical paths, and it is necessary that cycle time be made larger than the maximum values of these delays.

By contrast, the present invention is capable of adjusting the cycle time of each configuration to a previously programmed value by providing the delay adjusting circuit.

In a case where the cycle times preceding and succeeding the cycle time of a configuration having a large critical path delay can be shortened, the cycle time of the configuration having a large critical path delay is able to be elongated correspondingly. As a result, the maximum operating frequency can be raised and processing efficiency improved.

In this example, naturally the wiring connection circuit 113, which is a switch element, and the configuration information memory 111 may be constructed as blocks separate from the processor element 11. Conversely, the delay adjusting circuit 13 and instruction code memory (not shown) may be incorporated in the processor element 11.

The arrangement above is one in which the state number 19 serves as an address. However, it is possible to adopt an arrangement in which the address is made an address associated with the state number 19 and this address is allocated to the configuration information memory 111, instruction code memory (not shown) and delay control information memory 14.

Figure 5:
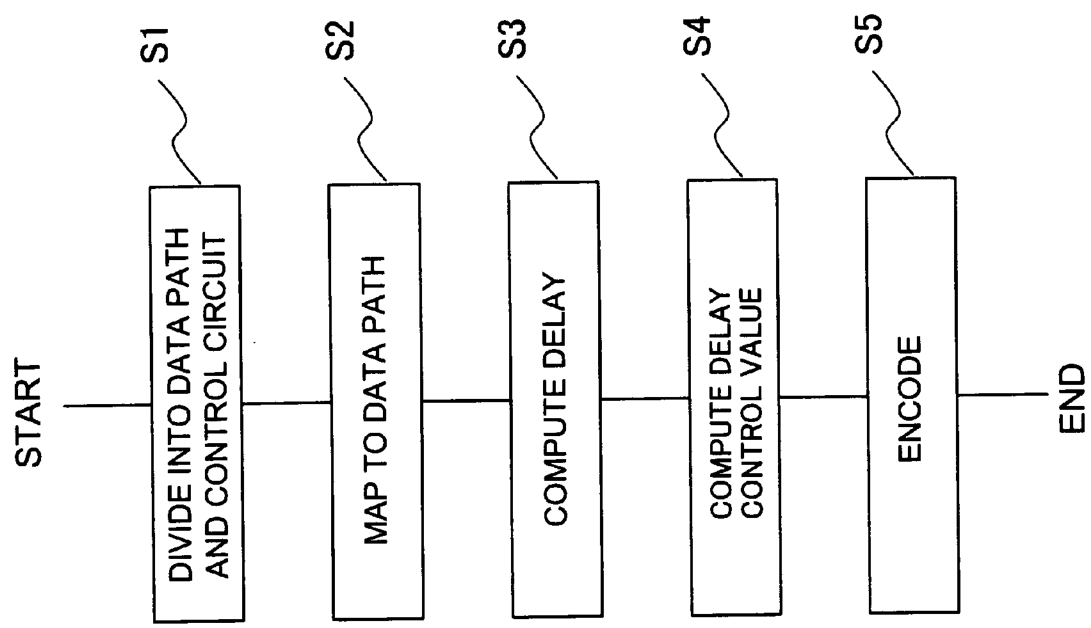
FIG. 5 is a flowchart useful in describing the procedure of the second example of the present invention.

Next, reference will be had to FIG. 5 to describe a method of generating a state number, configuration information, instruction code and delay control information in the array-type processor of the present invention. In this specification, the generation of these items is referred to as "compilation". FIG. 5 is a flowchart illustrating a method of generating a state number, configuration information, instruction code and delay control information in the array-type processor of the present invention in all examples thereof. As described above, these items are generated by compiling an application program. Before the array-type processor is actually operated, the state numbers are stored in the state-transition table memory, the configuration information is stored in the configuration information memory 111, the instruction codes are stored in the instruction code memory and the delay control information is stored in the delay control information memory 14.

Data processing (an application program) of interest is divided into processing executed by the data path unit and processing executed by the state-transition management unit (step S1). Specifically, the data processing of interest is divided into a plurality of processes, the divided processes are assigned to the data path unit 10, and control of the processing sequence of the divided processes is assigned to the state-transition management unit 12. The processing sequence of the divided processes is indicated as the order of storage of state numbers stored in the state-transition table memory.

Next, the processing executed by the data path unit 10 is mapped to the data path unit (step S2). That is, assignment of the processor elements 11 and the switch connections is carried out. Since the mapping here is compilation processing, it is carried out virtually and there is no change in the actual circuit configuration of the data path unit. After the mapping to the data path unit 10 is performed, the critical path delay of each configuration surface is performed and the maximum value thereof is found (step S3). The critical path is the maximum propagation delay time of the data on the data path of a combinational logic circuit in the sequence circuit generated by mapping. The reciprocal of this maximum delay is adopted as the provisional maximum operating frequency.

Next, whether the actual maximum operating frequency can be made faster than the provisional maximum operating frequency is determined by the mechanism of the programmable delay 15.

Specifically, note is taken of the configuration for which the critical path delay is largest, and whether there is any margin (timing margin) on either side is determined. If there is margin, then the margin is used to lengthen the cycle time of the configuration for which the critical path delay is largest. In other words, the amount of margin that can lengthen the clock cycle time is correlated with a state number and generated as the delay control information 17.

Mapping information and delay control information is computed (step S4), as described above, and this is finally encoded into data of a format that can be written to memory (step S5).

Second Example

Figure 4:
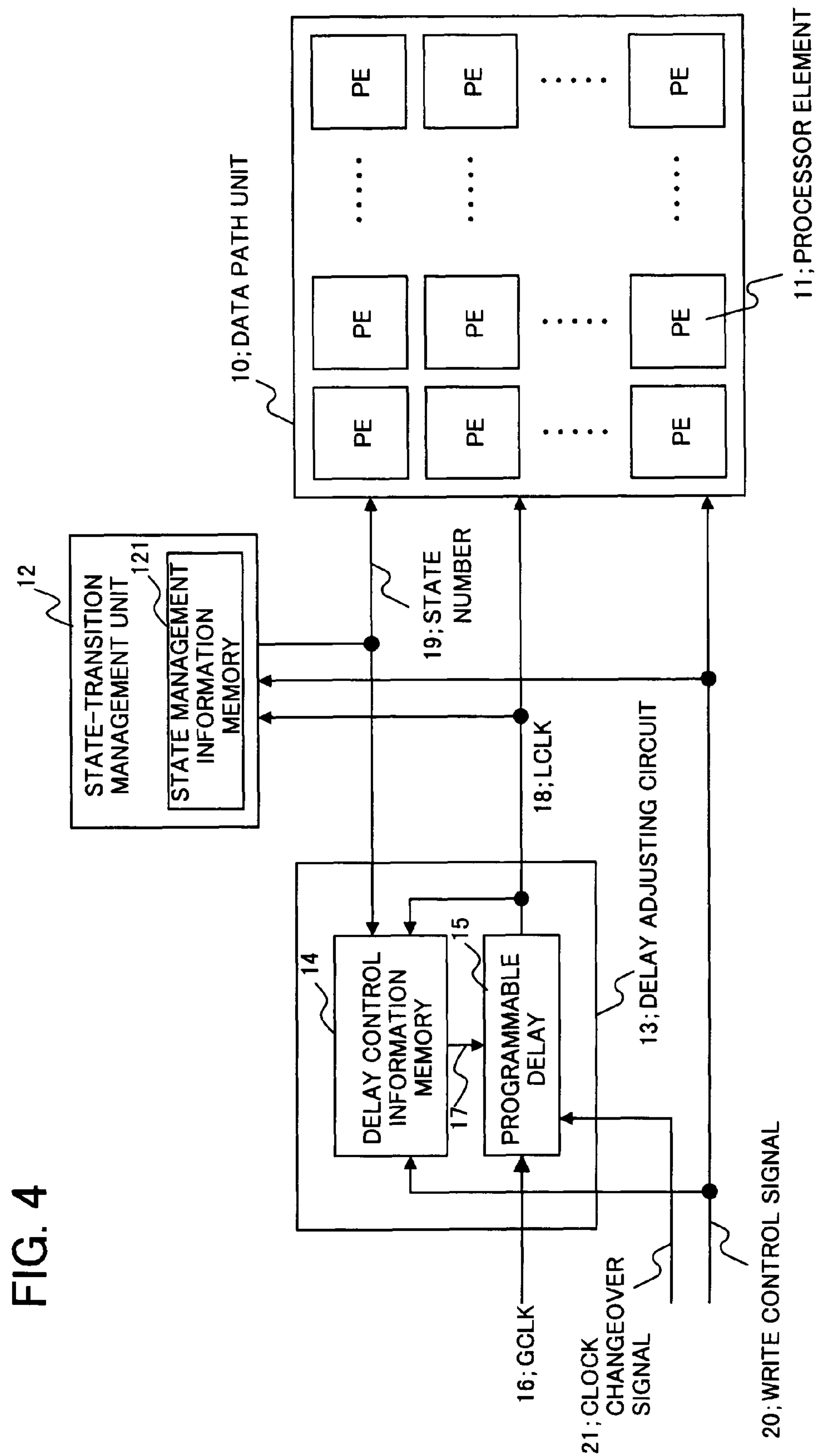
FIG. 4 is a diagram illustrating the arrangement of a second example of the present invention.

A second example of the present invention will be described next. FIG. 4 is a block diagram in the second example of an array-type processor having the delay adjusting circuit of the present invention. The second example is obtained by providing the first example with a write control signal 20 and clock changeover signal 21.

The write control signal 20 and clock changeover signal 21 are input from outside the array-type processor of the invention and are utilized in order to control write (read-in) of a state number, configuration information, instruction code and delay control information (referred to below as "items of data" in this example) from outside the array-type processor of this invention and in order to control the synchronization timing of input/output signals to and from the exterior of the array-type processor.

The write control signal 20 is input to the delay control information memory 14 of the delay adjusting circuit 13, a state control information memory 121 in the state-transition management unit 12 and the configuration information memory 111 in each processor element 11, and controls the writing of data to these memories. The data written to these memories is created through the flow of FIG. 5.

The clock changeover signal 21, on the other hand, is input to the programmable delay 15.

The operation of the array-type processor of this example using the write control signal 20 and clock changeover signal 21 will be described below.

The generation of the items of data to the array-type processor shown in FIG. 5 is executed before the start of data processing using the state-transition management unit 12 and data path unit 10.

The clock changeover signal 21 is a signal for performing control to change over the output of the programmable delay 15 between a signal for when the items of data are written and signal for when data processing is executed. When the items of data are written, the programmable delay 15 is adjusted in such a manner that data transfer between the output source of the write control signal 20 and the data write destination (delay control information memory 14, state control information memory 121 and configuration information memory 111 in the processor element 11) will be performed synchronously. For example, when items of data are written, the delay of the programmable delay 15 becomes zero.

Further, when data processing is executed, the local clock (LCLK) 18 obtained by delaying the global clock (GCLK) 16 in accordance with the delay control information 17 is output in a manner similar to that of the first example.

The write control signal 20 is composed of data, an address designating the write destination and a write-enable signal.

When the items of data are written, first the programmable delay 15 is changed over by the clock changeover signal 21 and writing is performed in sync.

Next, writing is performed by controlling the data, address and enable of the write control signal 20. Following the end of program operation, the clock is changed over by the clock changeover signal and data processing is started.

By using the clock changeover signal 21 to change over the clock output between the output when the items of data are written and the output at the time of data processing, synchronization with the external source of write can be achieved when the items of data are written. At the time of data processing, cycle time can be changed using the programmable delay 15.

Third Example

Figure 6:
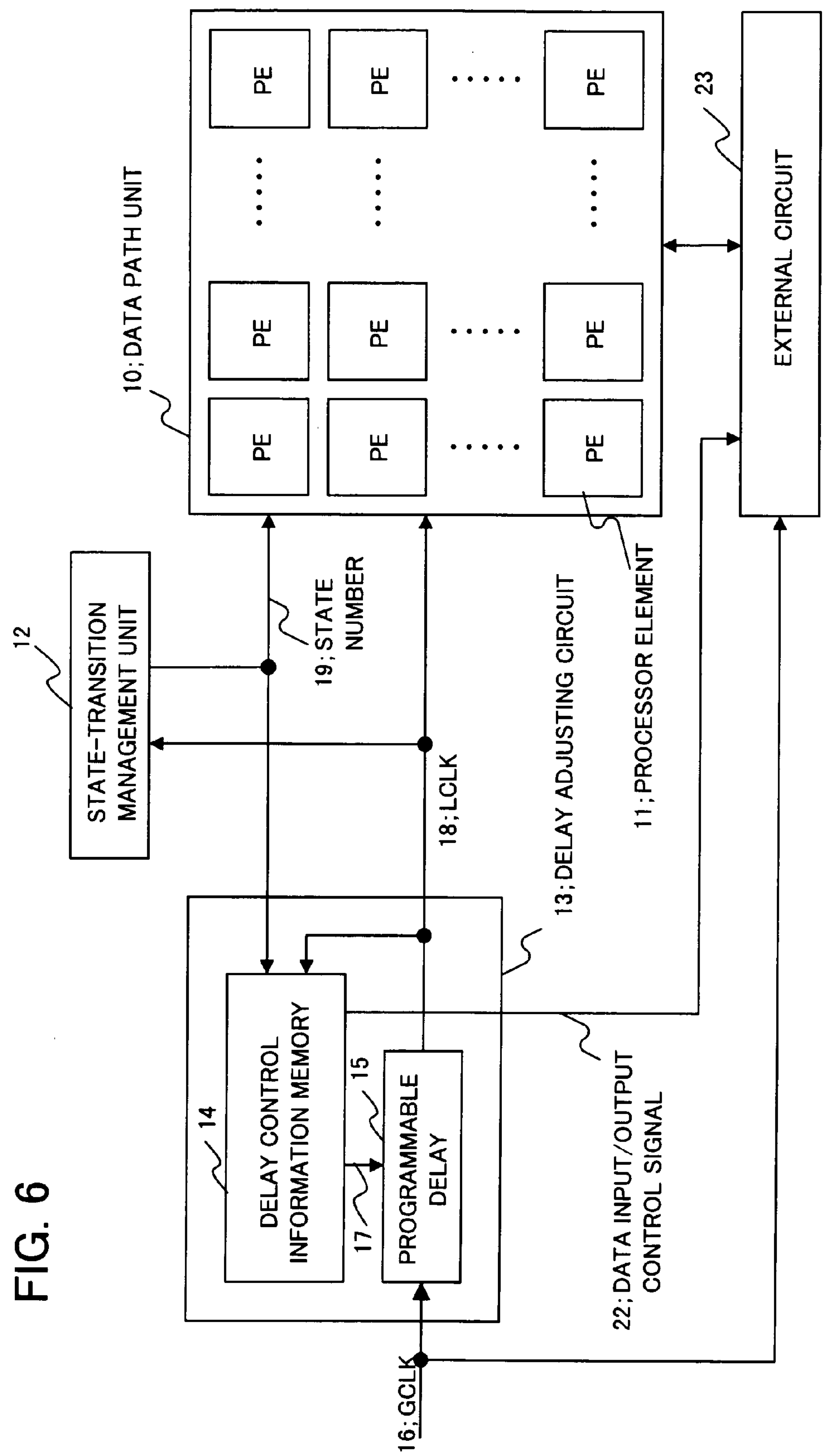
FIG. 6 is a diagram illustrating the arrangement of a third example of the present invention.

A third example of the present invention will be described next. FIG. 6 is a diagram illustrating the configuration of the third example. The third example is obtained by providing the first example with a data input/output control signal 22. The data input/output control signal 22 controls whether or not to perform a transfer between the data path unit 10 and registers or memories in an external circuit 23.

The delay control information memory 14 has data input/output control information in addition to delay control information. Further, the data input/output control information also is associated with the state number 19. In addition to the configuration information conforming to the state number 19, the delay adjusting circuit 13 outputs the data input/output control information from the delay control information memory 14 as the data input/output control signal 22.

Figure 7:
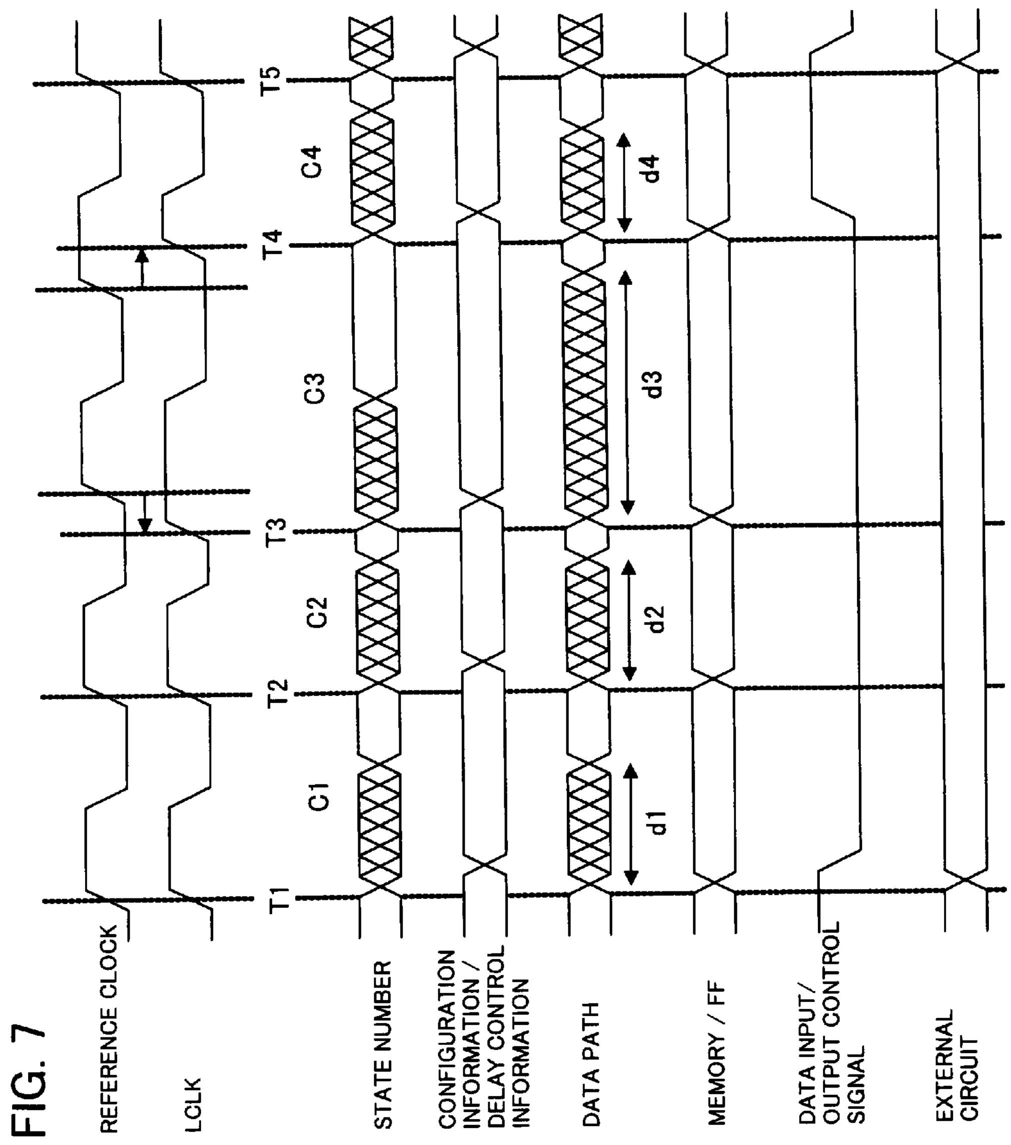
FIG. 7 is a timing chart useful in describing the operation of the third example of the present invention.

FIG. 7 is a timing chart useful in describing the operation of the third example of the present invention. In FIG. 7, T1, T2, T3, T4 and T5 represent the rise timings of the local clock (LCLK), and C1, C2, C3 and C4 represent the intervals between these timings. A reference clock shown in FIG. 7, is illustrated in order to facilitate understanding. In a case where the global clock (GCLK) 16 is delayed by a fixed delay and the cycle time is not changed by delay control, the reference clock is output as the local clock (LCLK). Further, d1, d2, d3 and d4 are delay values of critical (maximum delay) paths of data paths formed in each cycle. The delay value differs depending upon the data path formed. Here d3 is the largest and is greater than the cycle time of the global clock.

In the example shown in FIG. 6, the data input/output control signal 22 is a single bit. In a case where the level is high at the rising edge of the clock, data is loaded in the registers and memories of the external circuit 23. Although output of data to the external circuit 23 is taken as an example here, it is also possible to input data to the data path unit at the same timing.

The cycle time of the clock supplied to the data path unit 10 can be changed by the programmable delay 15.

However, the external circuit 23 that performs the data transfer with the data path unit 10 usually operates at a fixed clock cycle. In the example shown in FIG. 7, a data transfer with the external circuit 23 is performed at timing T5.

The timing T5 at which the local clock (LCLK) rises is decided by the delay control information 17 read out in the C4 cycle. This delay information has been set beforehand so as to be in sync with the reference clock.

Further, the data input/output control signal 22 also has been set to "1". At timing T5, "1" is output as the data input/output control signal.

As a result, the data path unit 10 operates in sync with the external circuit 23 at timing T5.

In a case where the data input/output control signal 22 is "1", it will suffice to input or output data to or from the external circuit 23.

At the time of the data transfer with the external circuit 23, the local clock (LCLK) is adjusted-by the programmable delay 15, thereby making it possible to achieve synchronization between the data path unit 10 and external circuit 23. Furthermore, by outputting the data input/output control signal 22 to the external circuit 23, data input/output with respect to the external circuit 23 can be controlled by observing this signal.

Fourth Example

Figure 8:
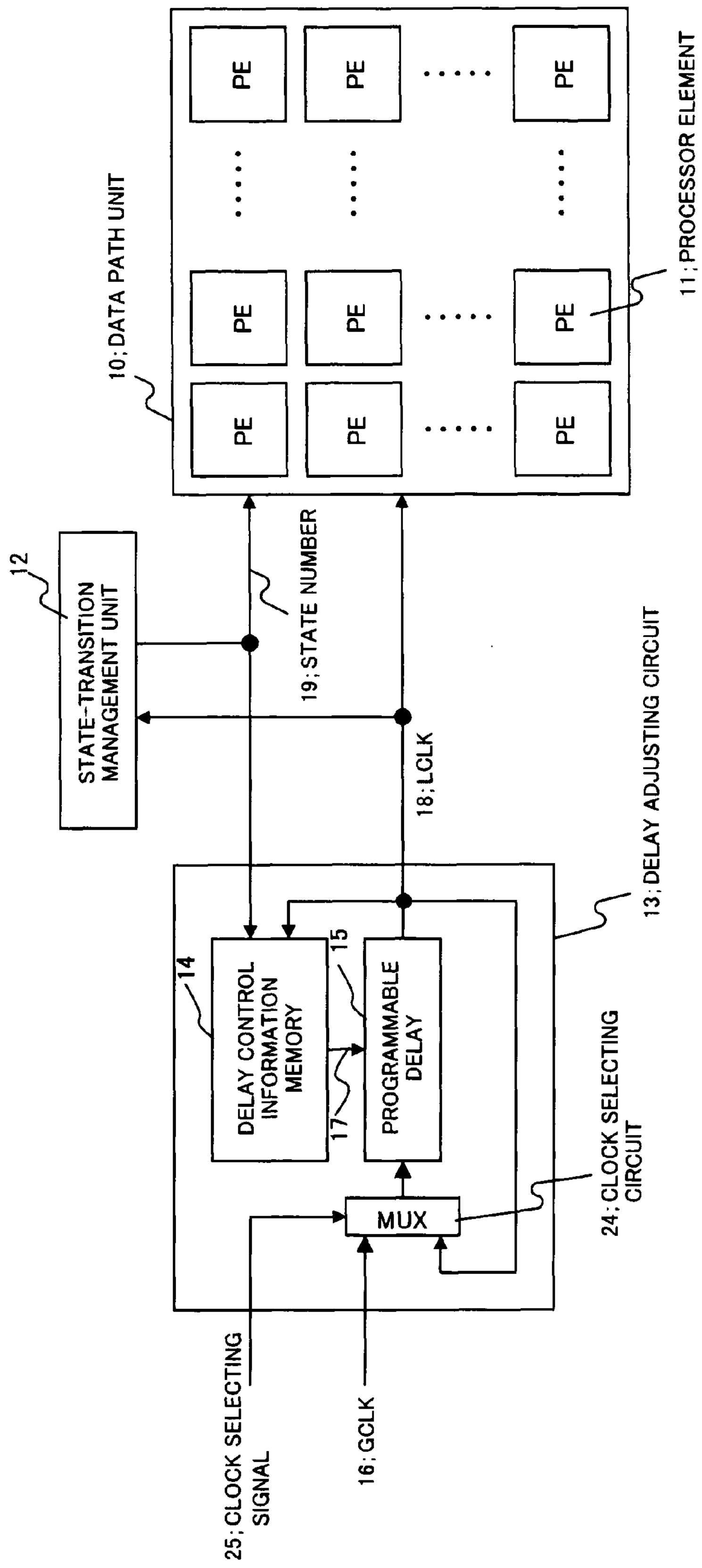
FIG. 8 is a diagram illustrating the arrangement of a fourth example of the present invention.

A Fourth example of the present invention will be described next. FIG. 8 is a diagram illustrating the configuration of the fourth example. The fourth example is obtained by providing the first example with a clock selecting circuit (MUX) 24 and a clock selecting signal 25.

The global clock (GCLK) 16, local clock (LCLK) 18 and clock selecting signal 25 are input to the clock selecting circuit 24. The global clock (GCLK) or local clock (LCLK) is selected and output by the clock selecting signal 25. The output of the clock selecting circuit 24 is input to the programmable delay 15.

Figure 9:
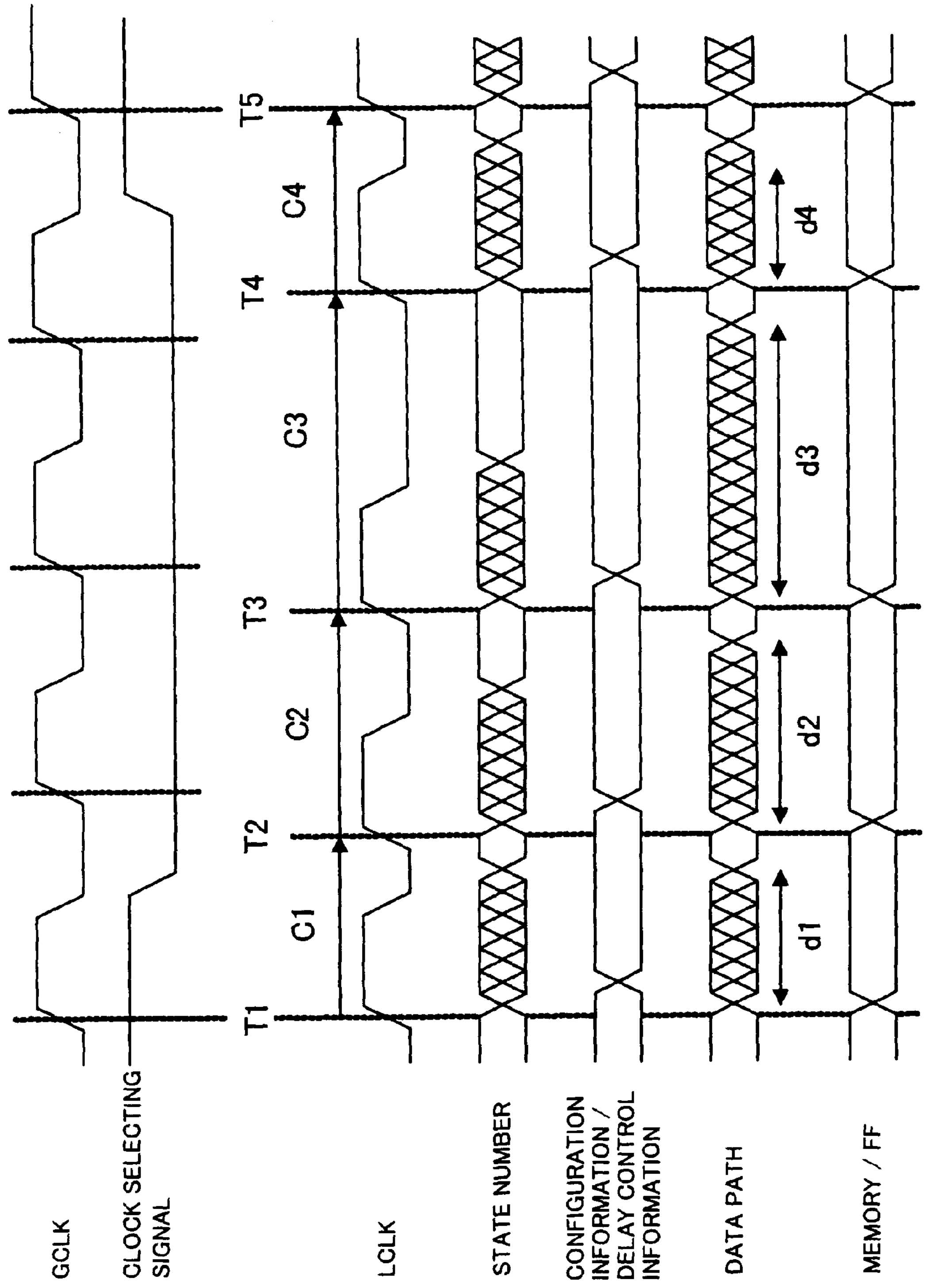
FIG. 9 is a timing chart useful in describing the operation of the fourth example of the present invention.

FIG. 9 is a timing chart useful in describing the operation of the fourth example of the present invention. In FIG. 9, T1, T2, T3, T4 and T5 represent the rise timings of the local clock (LCLK), and C1, C2, C3 and C4 represent the intervals between these timings,. A reference clock shown in FIG. 9 is illustrated in order to facilitate understanding. In a case where the global clock (GCLK) 16 is delayed by a fixed delay and the cycle time is not changed by delay control, the reference clock is output as the local clock (LCLK). Further, d1, d2, d3 and d4 are delay values of critical (maximum delay) paths of data paths formed in each cycle.

The delay value differs depending upon the data path formed. Here d3 is the largest and is greater than the cycle time of the global clock (GCLK).

The clock selecting circuit 24 outputs the global clock (GCLK) when the clock selecting signal 25 is at the high level and outputs the local clock (LCLK) when the clock selecting signal 25 is at the low level.

Since the clock selecting signal 25 is at the high level at timings T1 and T5, the clock selecting circuit 24 selects the global clock (GCLK) at these timings.

Since the clock selecting signal 25 is at the low level at timings T2, T3 and T4, on the other hand, the clock selecting circuit 24 selects the local clock (LCLK) at these timings.

When the local clock (LCLK) rises, the delay control information 17 is read out of the delay control information memory 14 using the state number 19 as the address.

The programmable delay 15 delays the output clock of the clock selecting circuit 24 in accordance with the delay control information 17.

The delay control information memory 14 is set beforehand in such a manner that the smallest delay value that is greater than the critical path delay time of the data path is selected.

In other words, in this example, the next clock cycle of LCLK can be output by applying an amount of delay, which is indicated by the delay control information 17, to the immediately preceding LCLK. Consequently, although cycle time cannot be elongated in a case where cycles before and after have no margin in the first example, cycle time can be decided in the fourth example irrespective of the cycles before and after. As a result, cases where adjustment is possible increase and operating frequency can be improved further.

It is so arranged that the timings T1 and T5 in FIG. 9 are forcibly made to conform to the reference clock in order to achieve synchronization with external circuitry.

All of the examples mentioned above illustrate examples of array-type processors in which configuration information and an instruction code that have been associated with a state number are stored in a configuration information memory and instruction code memory, respectively.

However, it goes without saying that the configuration information and instruction code may be lumped together and stored in the configuration information memory, and the configuration information and instruction code may be output from the configuration information memory to the data path. In this case, there are also instances where the state number is referred to as a configuration number in an array-type processor of this kind. Accordingly, it is possible for the array-type processor of the present invention to be constructed in such a manner that the configuration number is stored in the state-transition management unit 101, the circuit configuration of the data path unit and the instruction executed are changed by the configuration information, instruction code and delay control information 17 that have been associated with this configuration number, and the application is executed upon simultaneously changing the clock cycle that decides the timing of any operation by the delay control information 17.

In the related art, cycle time is fixed, there are critical paths for respective ones of data paths formed, and it is required that cycle time be made larger than the maximum value of these delays.

By contrast, in accordance with the present invention, there is provided the delay adjusting circuit so that the cycle time of each configuration can be freely adjusted to a predetermined programmed value.

In a case where cycle times, before and/or after the cycle time of a configuration having a large critical path delay, can be shortened, the cycle time of the configuration having a large critical path delay can be elongated correspondingly.

As a result, the maximum operating frequency can be raised and processing efficiency improved.

Though the present invention has been described in accordance with the foregoing examples, the invention is not limited to these examples and it goes without saying that the invention covers various modifications and changes that would be obvious to those skilled in the art within the scope of the claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An array-type processor comprising:

a data path unit that includes a plurality of processor elements arranged in an array;

a state-transition management unit that stores information for controlling changeover of a data path; and a delayed adjusting circuit that adjusts a delay of an input clock signal sue shied to said delay adjusting circuit, based upon information output from said state-transition management unit, and provides the delay-adjusted clock signal to the data path unit; length of the clock cycle of the delay-adjusted clock signal being adjustably changed in accordance with a critical path delay of the data path to be configured, the critical path including a plurality of the array processor elements of the data path to be configured, the critical path delay being the delay time of the critical path, wherein said delay adjusting circuit includes:

a delay control information memory; and a programmable delay;

wherein said delay control information memory stores a plurality of items of delay control information, delay control information is read out using a state number supplied from said state-transition management unit as an address, and the delay control information is supplied to said programmable array; and said programmable delay delays the clock signal by a delay time specified by the delay control information and provides the delayed clock signal to said data path unit, wherein said delay adjusting circuit receives a clock changeover signal for controlling changeover of an output from said programmable delay between an output at the time of program operation and an output at the time of data processing; and receives a write control signal that includes data prevailing at the time of program operation;

at the time of program operation on the basis of the clock changeover signal, said programmable delay is adjusted and data transfer is performed synchronously between an output source of the write control signal and a write destination of the data of the write control signal among said delay control information memory of said delay adjusting circuit, a state control information memory of said state-transition management unit and a configuration information memory within the processor element; and at the time of data processing on the basis of the clock changeover signal, a clock signal obtained by delaying the input clock signal by said programmable delay in accordance with the delay control information is output.

2. The array-type processor according to claim 1, wherein each processor element includes:

a configuration information memory that holds a plurality of items of configuration information, the configuration information being read out using a state signal supplied from said state-transition management unit, as an address;

a function unit that includes at least one function from among the function of an ALU, the function of a memory and the function of a register; and a wiring connection circuit that changes over connection configuration in said function unit in the processor element and connection configuration with other processor elements;

wherein said function unit and said wiring connection circuit have connection configuration and operation each decided by associated configuration information output from said configuration information memory.

3. The array-type processor according to claim 1, wherein said delay control information memory of said delay adjusting circuit is provided with data input/output control information in addition to the delay control information;

the input/output control information is output as a data input/output control signal in accordance with the state number, and the data input/output control signal is supplied to an external circuit that performs a data transfer with said data path unit; and the external control circuit controls data input/output by observing the data input/output control signal; delay of the clock signal being adjusted by said programmable delay in such a manner that synchronization between said data path unit and external circuit is achieved at the time of data transfer with the external circuit.

4. The array-type processor according to claim 1, wherein said delay adjusting circuit includes a clock selecting circuit that receives the input clock signal and the clock signal output from said programmable delay, selects one of the received signals based upon the value of a clock selection signal supplied thereto and supplies the selected signal to said programmable delay.

* * * * *